US008959624B2

(12) United States Patent
Gray et al.

(10) Patent No.: US 8,959,624 B2
(45) Date of Patent: Feb. 17, 2015

(54) EXECUTABLE DOWNLOAD TRACKING SYSTEM

(75) Inventors: Robert Gray, Southlake, TX (US); Anthony Morris, Forney, TX (US)

(73) Assignee: Bank of America Corporation, Charlotte, NC (US)

( * ) Notice: Subject to any disclaimer, the term of this patent is extended or adjusted under 35 U.S.C. 154(b) by 1234 days.

(21) Appl. No.: 11/932,510

(22) Filed: Oct. 31, 2007

(65) Prior Publication Data
US 2009/0113548 A1    Apr. 30, 2009

(51) Int. Cl.
*G06F 21/56* (2013.01)
*G06F 21/55* (2013.01)

(52) U.S. Cl.
CPC .............. *G06F 21/56* (2013.01); *G06F 21/552* (2013.01); *H04L 2209/60* (2013.01)
USPC .......... 726/22; 726/1; 726/23; 726/24; 726/25

(58) Field of Classification Search
CPC .... G06F 21/56; G06F 21/552; H04L 2209/60
USPC ....................................... 726/1, 22, 23, 24, 25
See application file for complete search history.

(56) References Cited

U.S. PATENT DOCUMENTS

| | | | |
|---|---|---|---|
| 5,623,600 A | | 4/1997 | Ji et al. |
| 6,151,643 A * | | 11/2000 | Cheng et al. .................... 710/36 |
| 6,269,456 B1 * | | 7/2001 | Hodges et al. ................ 714/38.1 |
| 6,785,820 B1 * | | 8/2004 | Muttik et al. .................... 726/24 |
| 6,792,543 B2 * | | 9/2004 | Pak et al. ......................... 726/24 |
| 7,080,000 B1 * | | 7/2006 | Cambridge ...................... 703/21 |
| 7,080,408 B1 * | | 7/2006 | Pak et al. ......................... 726/24 |
| 7,114,183 B1 | | 9/2006 | Joiner |
| 7,151,447 B1 | | 12/2006 | Willms et al. |
| 7,228,565 B2 * | | 6/2007 | Wolff et al. ..................... 726/24 |
| 7,237,258 B1 | | 6/2007 | Pantuso et al. |
| 7,237,267 B2 | | 6/2007 | Rayes et al. |

(Continued)

FOREIGN PATENT DOCUMENTS

EP    1335559 A     8/2003
EP    1335559 A2    8/2003

(Continued)

OTHER PUBLICATIONS

International Search Report and Written Opinion in corresponding PCT Application No. PCT/US2008/082087; Issued Jan. 13, 2009.

(Continued)

*Primary Examiner* — Jung Kim
*Assistant Examiner* — Thomas Ho
(74) *Attorney, Agent, or Firm* — Banner & Witcoff, Ltd.; Michael A. Springs (57) ABSTRACT

Systems and methods are disclosed for monitoring executable software applications on a computer network. Executable software applications and data files may be monitored by a risk monitoring system. The executable software application and data files may attempt to access a computer network and/or a computing device and a monitoring process may identify risks associated with the executable software application and/or data file. A suspicious characteristic of the executable software application may be identified during the monitoring process. The suspicious characteristic may be malware and may be neutralized before it causes damage to the computer network and/or computing device.

19 Claims, 5 Drawing Sheets

(56) References Cited

U.S. PATENT DOCUMENTS

| | | | |
|---|---|---|---|
| 7,278,019 B2 * | 10/2007 | Norman | 713/170 |
| 7,340,438 B2 | 3/2008 | Nordman et al. | |
| 7,418,733 B2 | 8/2008 | Connary et al. | |
| 7,457,965 B2 * | 11/2008 | Tamura et al. | 713/182 |
| 7,509,680 B1 * | 3/2009 | Sallam | 726/24 |
| 7,546,334 B2 | 6/2009 | Redlich et al. | |
| 7,739,211 B2 | 6/2010 | Coffman et al. | |
| 7,895,448 B1 | 2/2011 | Satish | |
| 8,256,004 B1 | 8/2012 | Hill et al. | |
| 8,275,899 B2 | 9/2012 | Beckett, III et al. | |
| 8,280,844 B2 | 10/2012 | Warn et al. | |
| 8,474,042 B2 | 6/2013 | Sorensen et al. | |
| 8,478,708 B1 | 7/2013 | Larcom | |
| 8,479,286 B2 | 7/2013 | Dalcher et al. | |
| 2003/0145228 A1 * | 7/2003 | Suuronen et al. | 713/201 |
| 2003/0191957 A1 | 10/2003 | Hypponen et al. | |
| 2003/0236995 A1 | 12/2003 | Fretwell | |
| 2004/0044912 A1 | 3/2004 | Connary et al. | |
| 2004/0153650 A1 | 8/2004 | Hillmer | |
| 2005/0044406 A1 | 2/2005 | Stute | |
| 2005/0050334 A1 * | 3/2005 | Liang et al. | 713/188 |
| 2005/0086526 A1 * | 4/2005 | Aguirre | 713/201 |
| 2005/0183143 A1 | 8/2005 | Anderholm et al. | |
| 2005/0187934 A1 | 8/2005 | Motsinger et al. | |
| 2005/0188221 A1 | 8/2005 | Motsinger et al. | |
| 2005/0188222 A1 | 8/2005 | Motsinger et al. | |
| 2005/0188423 A1 | 8/2005 | Motsinger et al. | |
| 2005/0203881 A1 | 9/2005 | Sakamoto et al. | |
| 2005/0273851 A1 | 12/2005 | Raju Datla et al. | |
| 2006/0004594 A1 | 1/2006 | Doliov | |
| 2006/0020814 A1 | 1/2006 | Lieblich et al. | |
| 2006/0041505 A1 | 2/2006 | Enyart | |
| 2006/0064740 A1 | 3/2006 | Kelley et al. | |
| 2006/0178918 A1 | 8/2006 | Mikurak | |
| 2007/0079379 A1 * | 4/2007 | Sprosts et al. | 726/24 |
| 2007/0113281 A1 | 5/2007 | Leach | |
| 2007/0143851 A1 | 6/2007 | Nicodemus et al. | |
| 2007/0169194 A1 | 7/2007 | Church et al. | |
| 2007/0180510 A1 | 8/2007 | Long et al. | |
| 2007/0186282 A1 | 8/2007 | Jenkins | |
| 2007/0204345 A1 | 8/2007 | Pereira et al. | |
| 2007/0222589 A1 | 9/2007 | Gorman et al. | |
| 2007/0226796 A1 | 9/2007 | Gilbert et al. | |
| 2007/0245420 A1 | 10/2007 | Yong et al. | |
| 2007/0268880 A1 | 11/2007 | Bellur et al. | |
| 2008/0034424 A1 | 2/2008 | Overcash et al. | |
| 2008/0082348 A1 | 4/2008 | Paulus et al. | |
| 2008/0109730 A1 | 5/2008 | Coffman et al. | |
| 2008/0162385 A1 | 7/2008 | Madani et al. | |
| 2008/0181213 A1 | 7/2008 | Ovsiannikov et al. | |
| 2008/0198231 A1 | 8/2008 | Ozdemir et al. | |
| 2008/0222734 A1 | 9/2008 | Redlich et al. | |
| 2008/0244034 A1 | 10/2008 | Shannon et al. | |
| 2008/0250484 A1 | 10/2008 | Chong et al. | |
| 2008/0256602 A1 | 10/2008 | Pagan | |
| 2008/0271143 A1 | 10/2008 | Stephens et al. | |
| 2008/0282339 A1 | 11/2008 | Nakae et al. | |
| 2009/0013410 A1 | 1/2009 | Kaler et al. | |
| 2009/0037997 A1 | 2/2009 | Agbabian et al. | |
| 2009/0043724 A1 | 2/2009 | Chesla | |
| 2009/0044005 A1 | 2/2009 | Komura et al. | |
| 2009/0064332 A1 | 3/2009 | Porras et al. | |
| 2009/0077666 A1 | 3/2009 | Chen et al. | |
| 2009/0126023 A1 | 5/2009 | Yun et al. | |
| 2009/0132813 A1 | 5/2009 | Schibuk | |
| 2009/0138592 A1 | 5/2009 | Overcash et al. | |
| 2009/0178139 A1 | 7/2009 | Stute et al. | |
| 2009/0178144 A1 | 7/2009 | Redlich et al. | |
| 2009/0198765 A1 | 8/2009 | Stamos et al. | |
| 2009/0207740 A1 | 8/2009 | Crotti et al. | |
| 2009/0241188 A1 | 9/2009 | Komura | |
| 2009/0249131 A1 | 10/2009 | Mitomo | |
| 2009/0254572 A1 | 10/2009 | Redlich et al. | |
| 2009/0271863 A1 | 10/2009 | Govindavajhala et al. | |
| 2009/0293128 A1 | 11/2009 | Lippmann et al. | |
| 2009/0328209 A1 | 12/2009 | Nachenberg | |
| 2010/0064039 A9 | 3/2010 | Ginter et al. | |
| 2010/0065039 A1 | 3/2010 | Chang et al. | |
| 2010/0121833 A1 | 5/2010 | Johnston | |
| 2010/0125911 A1 | 5/2010 | Bhaskaran | |
| 2010/0169971 A1 | 7/2010 | Raviv | |
| 2010/0212010 A1 | 8/2010 | Stringer et al. | |
| 2010/0269175 A1 | 10/2010 | Stolfo et al. | |
| 2010/0281543 A1 | 11/2010 | Golomb et al. | |
| 2011/0078156 A1 | 3/2011 | Koss | |
| 2011/0125658 A1 | 5/2011 | Lanxner et al. | |
| 2011/0153166 A1 | 6/2011 | Yester | |
| 2011/0185056 A1 | 7/2011 | McHugh et al. | |
| 2011/0202969 A1 | 8/2011 | Warn et al. | |
| 2011/0225650 A1 | 9/2011 | Margolies et al. | |
| 2012/0066763 A1 | 3/2012 | McHugh et al. | |

FOREIGN PATENT DOCUMENTS

| | | |
|---|---|---|
| GB | 2420961 A | 6/2006 |
| GB | 2436161 A | 9/2007 |

OTHER PUBLICATIONS

Examination Report from Great Britain application No. GB1007370.8, mailed Jan. 24, 2012.

International Search Report and Written Opinion issued in related International Patent Application No. PCT/US11/21149, dated Oct. 26, 2011.

International Search Report and Written Opinion issued in related International Patent Application No. PCT/US11/21152, dated Nov. 1, 2011.

International Search Report and Written Opinion issued in related application No. PCT/US11/32515, dated Jun. 27, 2011.

Office Action in related U.S. Appl. No. 12/694,067 mailed Jul. 30, 2013.

Non-Final office action for related U.S. Appl. No. 13/298,597 mailed Sep. 11, 2013.

Non-Final office action in related U.S. Appl. No. 13/903,215 mailed Sep. 12, 2013.

Office action in related U.S. Appl. No. 13/736,594 mailed Oct. 2, 2013.

International Search Report and Written Opinion of International application No. PCT/US11/44144 mailed Dec. 6, 2011.

Office Action for U.S. Appl. No. 12/841,332 mailed Oct. 1, 2013.

Office action for U.S. Appl. No. 12/841,332 mailed Mar. 7, 2013.

Office action for U.S. Appl. No. 12/841,332 mailed Sep. 26, 2012.

Office action for U.S. Appl. No. 12/841,323 mailed Nov. 29, 2012.

Office action for U.S. Appl. No. 12/841,323 mailed Jun. 6, 2012.

Notice of Allowance for U.S. Appl. No. 12/841,323 mailed Apr. 11, 2013.

International Search Report and Written Opinion for International application No. PCT/US11/44138 mailed Dec. 6, 2011.

Office action for U.S. Appl. No. 13/298,594 mailed Nov. 14, 2013.

Office action for U.S. Appl. No. 13/298,594 mailed Jun. 19, 2013.

Office action for U.S. Appl. No. 12/694,075 mailed Sep. 4, 2013.

Office action for U.S. Appl. No. 12/694,075 mailed Feb. 4, 2013.

Office action for U.S. Appl. No. 12/694,075 mailed Aug. 10, 2012.

Office action for U.S. Appl. No. 12/694,075 mailed Mar. 27, 2012.

Office action for U.S. Appl. No. 12/694,067 mailed May 22, 2012.

Office action for U.S. Appl. No. 12/694,067 mailed Dec. 21, 2011.

Office action for U.S. Appl. No. 12/694,067 mailed Nov. 7, 2011.

Notice of Allowance for U.S. Appl. No. 12/829,882 mailed Jun. 17, 2013.

Office action for U.S. Appl. No. 12/829,882 mailed Mar. 12, 2013.

Office action for U.S. Appl. No. 12/829,882 mailed Aug. 10, 2012.

Notification of Grant from Singapore Patent Office for Patent P-No. 184508 dated Nov. 15, 2013.

International Search Report and Written Opinion for International application No. PCT/US2008/082087 mailed Jan. 13, 2009.

Examination Report for application No. GB1007370.8 mailed Jan. 24, 2012.

Notification of Grant for patent application No. GB2466755 mailed Jan. 2, 2013.

(56) References Cited

OTHER PUBLICATIONS

Notice of Allowance for related U.S. Appl. No. 12/694,067 mailed Mar. 21, 2014.
Office Action for related U.S. Appl. No. 12/694,075 mailed Mar. 13, 2014.
Notice of Allowance in Related U.S. Appl. No. 12/841,332 mailed Mar. 6, 2014.
Notice of Allowance in related U.S. Appl. No. 13/298,594 mailed May 12, 2014.
Notice of Allowance in related U.S. Appl. No. 13/298,597 mailed Apr. 14, 2014.
Office action for related U.S. Appl. No. 12/694,067 mailed Feb. 24, 2014.
Office action for related U.S. Appl. No. 12/694,067 mailed Feb. 13, 2014.
Notice of Allowance for related U.S. Appl. No. 12/694,067 mailed Dec. 9, 2013.

* cited by examiner

| Antivirus | Version | Update | Result |
|---|---|---|---|
| AhnLab-V3 | 2007.4.19.1 | 04.19.2007 | no virus found |
| AntiVir | 7.3.1.53 | 04.19.2007 | TR/BHO.R.3 |
| Authentium | 4.93.8 | 04.18.2007 | no virus found |
| Avast | 4.7.981.0 | 04.19.2007 | Win32:Agent-GDH |
| AVG | 7.5.0.464 | 04.19.2007 | Generic3.TJJ |
| BitDefender | 7.2 | 04.19.2007 | no virus found |
| CAT-QuickHeal | 9.00 | 04.19.2007 | (Suspicious) - DNAScan |
| ClamAV | devel-20070416 | 04.19.2007 | Trojan.Agent-3355 |
| DrWeb | 4.33 | 04.19.2007 | no virus found |
| eSafe | 7.0.15.0 | 04.19.2007 | Suspicious Trojan/Worm |
| eTrust-Vet | 30.7.3579 | 04.19.2007 | no virus found |
| Ewido | 4.0 | 04.19.2007 | no virus found |
| FileAdvisor | 1 | 04.19.2007 | no virus found |
| Fortinet | 2.85.0.0 | 04.19.2007 | no virus found |
| F-Prot | 4.3.2.48 | 04.18.2007 | no virus found |
| F-Secure | 6.70.13030.0 | 04.19.2007 | Trojan.Win32.Agent.ajd |
| Ikarus | T3.1.1.5 | 04.19.2007 | Trojan.Win32.Agent.ajd |
| Kaspersky | 4.0.2.24 | 04.19.2007 | Trojan.Win32.Agent.ajd |
| McAfee | 5013 | 04.19.2007 | Downloader-AVZ |
| Microsoft | 1.2405 | 04.19.2007 | no virus found |
| NOD32v2 | 2205 | 04.19.2007 | Win32/TrojanDownloader.Agent.NKF |
| Norman | 5.80.02 | 04.19.2007 | W32/Agent.BKHC |
| Panda | 9.0.0.4 | 04.19.2007 | Suspicious file |
| Prevx1 | V2 | 04.19.2007 | no virus found |
| Sophos | 4.16.0 | 04.17.2007 | Mal/Packer |
| Sunbelt | 2.2.907.0 | 04.14.2007 | no virus found |
| Symantec | 10 | 04.19.2007 | no virus found |
| TheHacker | 6.1.6.095 | 04.15.2007 | no virus found |
| VBA32 | 3.11.3 | 04.19.2007 | Trojan.Win32.TrojanDownloader.Agent.NKF |
| VirusBuster | 4.3.7:9 | 04.19.2007 | no virus found |
| Webwasher-Gateway | 6.0.1 | 04.19.2007 | Trojan.BHO.R.3 |

Additional Information

File size: 143360 bytes
MD5: 4450174dfd3e15f8928dcda50851a4e0
SHA1: fc4761c4cfb0ce42dddf5d7f6b602335720d9771
packers: ASPack, ASPack
packers: ASPACK, ASPACK, ASPACK, ASPACK, BINARYRES
packers: Aspack

FIGURE 5

EXECUTABLE DOWNLOAD TRACKING SYSTEM

FIELD OF THE INVENTION

Aspects of the disclosure relate to monitoring computer-executable instructions that are downloaded on a computer network and/or computing device. More specifically, aspects of the disclosure describe systems and methods for identifying a risky, possibly risky, or suspicious software.

BACKGROUND

Computers and computer network are constantly threatened by malware such as computer viruses, worms, keyloggers, Trojans, and other damaging executable software. Oftentimes, the malware is received by a computer network in the form of an executable software application as a download, update or the like and may infect and damage servers, computing devices, and other electronic devices and software that are electronically coupled to the computer network. The malware can infect any computing device that is internally or externally coupled to the computer network. Such malware causes significant damage to the servers, computing devices, and other electronic devices and results in expensive and time-consuming repairs.

The malware may be detected by anti-virus software, scanning software, and other software tools that analyze an executable software application to determine whether it is malware. Many executable software applications that contain malware or are suspected to contain malware contain a signature that is detected by the anti-virus software, scanning software, or other network security/protection tools. The malware signatures may be static or dynamic and may be used to block the malware from the computer network. The malware signature may also be used to identify the source of the malware.

Many current methods and systems of monitoring executable software for malware are performed on a manual basis, which may be time-consuming and provide moderates levels of accuracy. Further, many current methods and systems of detecting malware update a computer network on periodic basis, such as once per week. The window between updates creates a security risk for the dynamic malware signature to change and the anti-virus software, scanning software, and the like to fail to identify the malware as a risk. Further, malware having a dynamic signature morphs its signature, preventing the anti-virus software from determining the source of the malware. Some malware may not be easily or quickly neutralized and may need to be manually cleaned, which is also very time-consuming, expensive, and risky. Such malware may cause damage to the computer network before a solution is implemented.

Therefore, a system and method for monitoring executable software for malware is needed that is efficient, and capable of identifying morphing malware signatures, determine the source of the malware. Further, a system and method for monitoring executable software is needed that may neutralize and block a source of malware and may prevent the malware from causing damage to the computer network.

BRIEF SUMMARY OF THE INVENTION

Aspects of the present disclosure address one or more of the issues mentioned above by describing a system and method for monitoring computer-executable instructions. The following presents a simplified summary of the disclosure in order to provide a basic understanding of some aspects of the systems and methods for monitoring computer-executable instructions. It is not intended to identify key or critical elements of the invention nor is it intended to delineate the scope of the invention. The following summary merely presents some concepts of the disclosure in a simplified form as a prelude to the more detailed description provided below.

In one example in accordance with aspects of the disclosure, a method of monitoring computer-readable instructions is illustrated. An executable portion of the computer readable instructions may be identified and received on a computer network from a source. The executable portion of the computer readable instructions may be classified as a risk. The risk may be neutralized on the computer network and the source of the risk may be identified.

In another example in accordance with aspects of the disclosure, a method is illustrated of monitoring data files on a computer network that receives an executable software application on a first computer network from a second computer network. At least one suspicious characteristic of the executable software application may be identified and the suspicious characteristic is analyzed to determine whether it is malware. The malware having a suspicious characteristic may be prevented from contaminating the first computer network by at least one of filtering, blocking, rejecting, and neutralizing.

In yet another example in accordance with aspects of the invention, a risk monitoring system is illustrated that includes a computing device, a receiver, server, and the processor. The computing device may contain computer readable instructions for authenticating an executable software application that may be received on a computer network. The receiver may receive data associated with the executable software application. The server may comprise memory for storing the data in a data file. The processor may execute the executable portion of the computer readable instructions that perform a method that includes receiving an executable software application on a first computer network from a second computer network; identifying at least one suspicious characteristic of the executable software application; determining whether the at least one suspicious characteristic of the executable software application is malware; and preventing the malware from contaminating the first computer network by at least one of filtering, blocking, rejecting, and neutralizing.

BRIEF DESCRIPTION OF THE DRAWINGS

The present disclosure is illustrated by way of example and not limited in the accompanying figures in which like reference numerals indicate similar elements and in which:

FIG. 5 is a report generated to illustrate the results of an analysis of an executable download, in accordance with an aspect of the invention.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. Additional specific arrangements of parts, example devices, systems, and environments may be utilized and structural and functional modifications may be made without departing from the scope of the present invention.

A. GENERAL DESCRIPTION OF A SYSTEM AND METHOD OF MONITORING AN EXECUTABLE SOFTWARE APPLICATION ACCORDING TO AN ASPECT OF THE INVENTION

In general, as described above, aspects of the invention relate to monitoring executable files that are received on a computer network. In accordance with at least some aspects of the invention, a method of monitoring computer readable instructions that may comprise: (a) identifying an executable portion of the computer readable instructions received by a computer network from a source; (b) classifying the executable portion of the computer readable instructions as a risk; (c) neutralizing the risk on the computer network; and (d) identifying the source of the risk.

The computer readable instructions may include an executable portion that is in the form of a download, an update, or other similar computer readable instructions that are received on a computer network. The executable portion of the computer readable instructions may be received from a source that is internal or external to the computer network such as a location on a server having an Internet Protocol address and/or domain name and/or a group of websites that are coupled together to form a "phone home" website that is designed to access the computer network and export data and other information out of the computer network to a website related to the "phone home" website. The malware may be from a source such as an Internet Protocol address or a website or any other computer storage media capable of accessing a computer network.

The executable portion of the computer readable instructions may also be classified as being a risk. The risk may be malware such as a computer virus, a worm, a keylogger, and/or a Trojan. The risk may be neutralized by blocking the risk from accessing the computer network, by cleaning the executable portion of the computer readable instructions, identifying related IP address, and other risk/security related solutions. The source of the risk may be identified and blocked, reported, and/or tagged/labeled as a risk.

In accordance with another aspect of the invention, a method of monitoring executable software that may comprise: a method of monitoring data files on a computer network may comprise: (a) receiving an executable software application on a first computer network from a second computer network; (b) identifying at least one suspicious characteristic of the executable software application; (c) determining whether the at least one suspicious characteristic of the executable software application is malware; and (d) preventing the malware from contaminating the first computer network by at least one of filtering, blocking, rejecting, and neutralizing.

As described above, the computer readable instructions may include an executable portion that is in the form of a download, an update, or other similar computer readable instructions that are received on a computer network from a source such as a website, Internet protocol address, or another computer storage media. A location on one computer network may communicate or send a download, update, or the like to a location on a second computer network.

The executable portion of the computer readable instructions may have one or more suspicious characteristics that may indicate the presence of a risk. The suspicious characteristic or characteristics may be used to determine whether the executable software application includes malware. The executable portion of the computer readable instructions that are determined to include malware may be prevented from contaminating the first network. The malware may be filtered, blocked, rejected, and neutralized to prevent contamination to the first computer network.

In accordance with yet another aspect of the invention, a risk monitoring system is illustrated. The risk monitoring system includes a computer device, a receiver, a server, and a processor. The computing device may contain computer readable instructions for authenticating an executable software application that is received on a computer network. The authentication process may include verifying that the executable software application does not contain malware or another risk that may be damaging to the computer network. The authenticating process may also include cleaning the executable software application and/or marking or tagging it for further analysis.

The receiver may receive data that is associated with the executable software application. The receiver may receive data from a computer network that is not associated with the first computer network. For example, the receiver may receive data from any computer network that is not already coupled to the server or that is received through a computer storage media at a computing terminal or computing device that is coupled to the first computer network. The server may comprise a memory for storing data in a data file.

The processor may execute the computer executable instructions to perform a method. The processor may receive an executable software application on a first computer network from a second computer network and may identify at least one suspicious characteristic of the executable software application. The at least one suspicious characteristic may be determined to be malware and may be prevented from contaminating the first computer network by at least one of filtering, blocking, rejecting, and neutralizing. The malware may be prevented from damaging the first computer network or any other computing device that accesses the first computer network.

B. SPECIFIC EXAMPLES OF THE INVENTION

The various figures in this application illustrate examples of a system and method of monitoring executable software applications on a computer network. When the same reference number appears in more than one drawing, that reference number is used consistently in this specification and the drawings to refer to the same or similar parts throughout.

Figure 1:
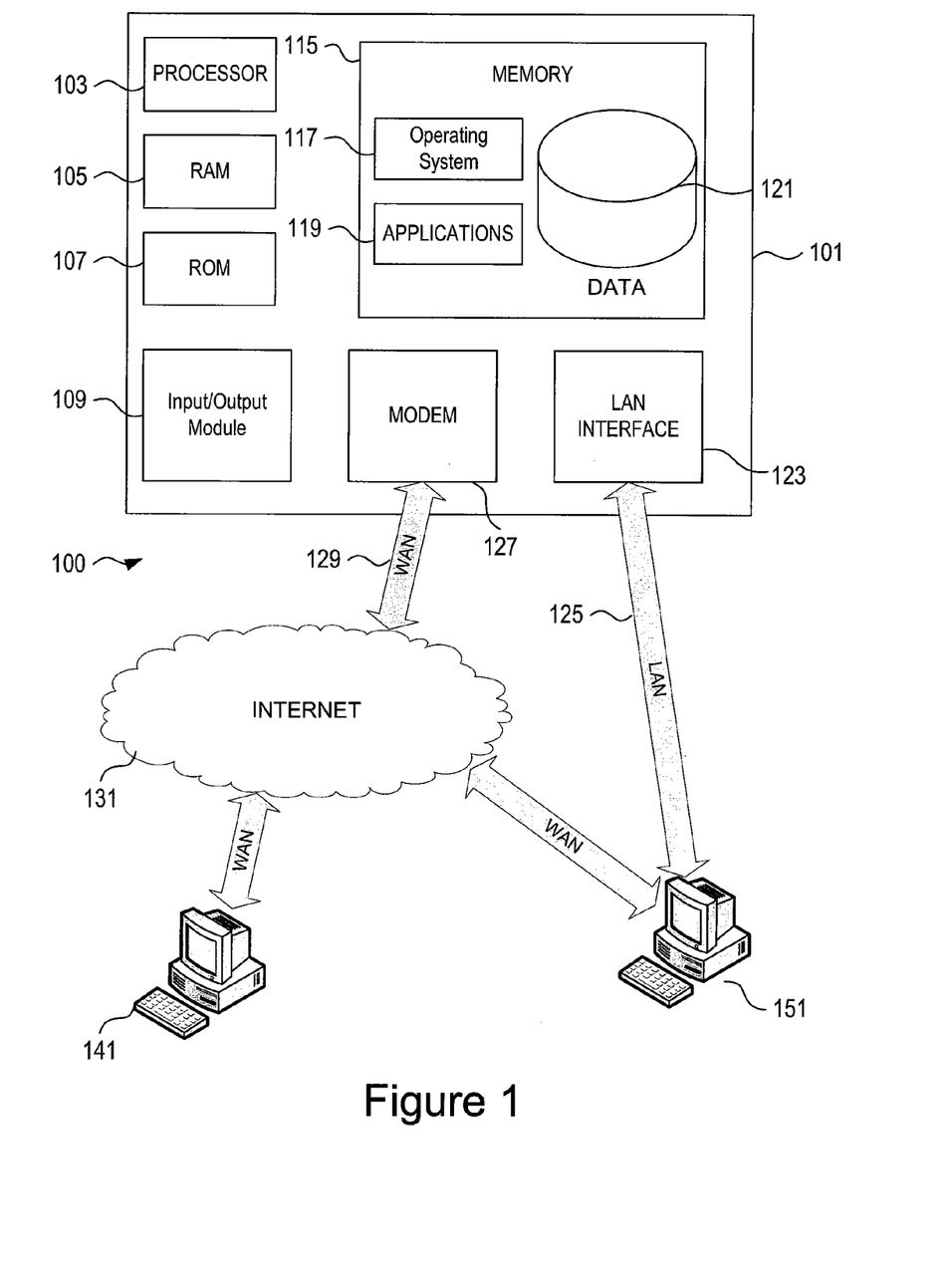
FIG. 1 illustrates a computing device for implementing an embodiment of the invention.

FIG. 1 illustrates an example of a computing system environment 100 that may be used according to one or more embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of the illustrated components.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, and the like, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, an input/output module or BIOS 109, and a memory 115. The computer 101 typically includes a variety of computer readable media. The computer readable media may be any available media that may be accessed by the computer 101 and may include both volatile and nonvolatile media and removable and non-removable media. By way of example, and not limitation, computer readable media may comprise computer storage media and communication media.

Computer storage media may include volatile and nonvolatile and removable and non-removable media implemented in any method or technology for storage of information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, and any other medium that can be used to store the desired information and that can be accessed by the computer 101.

Communication media may embody computer readable instructions, data structures, program modules, and/or other data in a modulated data signal such as a carrier wave or other transport mechanism. It may also include any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more applications representing the application data stored in RAM 105 while the computer is on and corresponding software applications (e.g., software tasks) are being executed.

The input/output module or BIOS 109 may include a microphone, keypad, touch screen, and/or stylus through which a user of the computer 101 may provide input. The input/output module or BIOS 109 may also include one or more of a speaker for providing audio output and a video display device for providing textual, audiovisual, and/or graphical output.

Software may be stored within memory 115 and/or storage to provide instructions to the processor 103 for enabling the computer 101 to perform various functions. For example, the memory 115 may store software used by the computer 101, such as an operating system 117 and an associated data file 121. Alternatively, some or all of the computer executable instructions for the computer 101 may be embodied in hardware or firmware (not shown). As described in detail below, the data file 121 may provide centralized storage of the country assessment and/or geographic model.

The computer 101 may operate in a networked environment that supports connections to one or more remote computers, such as computing devices 141 and 151. The computing devices 141 and 151 may be personal computers or servers that include many or all of the elements described above relative to the computer 101. The network connections depicted in FIG. 1 may include a local area network (LAN) 125 and a wide area network (WAN) 129 and may also include other networks. The computer 101 is connected to the LAN 125 through a network interface or adapter 123. The computer 101 may be a server and may include a modem 127 or other means for establishing communications over the WAN 129. For example, the computer 101 may connect to a WAN 129 such as the Internet 131 through a modem connection. The network connections may include any communications link between computers.

The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program may be used by the computer 101 according to an embodiment of the invention. The application program may include computer executable instructions for invoking user functionality related to communication, such as email, short message service (SMS), and voice input and speech recognition applications.

The computing devices 141 or 151 may also be mobile terminals including various other components, such as a battery, speaker, and antennas (not shown). The input/output module or BIOS 109 may include a user interface including such physical components as a voice interface, one or more arrow keys, joystick, data glove, mouse, roller ball, touch screen, or the like.

Each of the plurality of computing devices 141, 151 may contain software for creating a data file 121. The software may be a set of detailed computer-executable instructions for the computing devices 141, 151. The software may provide the computing devices 141, 151 with the ability to create a data file 121. The data file 121 may contain multiple individual files of information that may each correspond to an individual document. For example, if a plurality of applications or set of computer-executable instructions are being monitored as each one is received onto a computer network, then each application's assessment may be separately contained within the data file 121. Additionally, a report may be generated that includes information relating to one or more applications in the data file 121.

The computer 101 may include memory 115 for storing computer-readable instructions and a processor 103 for executing the computer-executable instructions. The computer-executable instructions may be data in the form of program source code that may be capable of modifying the data file 121. The computer-executable instructions may be a series or sequence of instructions for a computing device that is typically in the form of a programming language such as C++, Java, SQL, or the like. A person of ordinary skill in the art will appreciate that various computer programming languages may be used to create the computer-executable instructions, and the invention is not limited to the programming languages listed above.

The memory 115 may be a portion of the computer 101 that stores data or other instructions. The memory 115 may be retained or lost when power is lost to the system. The memory 115 may provide access to data for a user or computing device 141, 151 to revise and manage a data file 121.

The processor 103 may be capable of executing the computer-executable instructions. The computer-executable instructions may be executed by the processor 103 after they have been stored in the memory 115. The processor 103 may be a centralized element within a computing system that is capable of performing computations. For example, the processor 103 may perform the computations that are described in the computer-executable instructions and then execute the computer-executable instructions. The computer-executable instructions may include data describing changes to the data file 121 that were made by a user or computing device 141, 151 over a computer network such as the Internet 131. The server 101 stores the data in the data file 121 that may be associated with a user's profile. The data file 121 may be stored in the memory 115 so that it may be accessible to a plurality of computing devices 141, 151 and/or users.

The user data may be stored in the data file 121. Security precautions may be implemented to prevent unauthorized access to the data file 121. A user identification and a password may be required to access the data file 121 and/or the data relating to monitoring the executable software application. Some of the data that is stored in the data file 121 may be shared between multiple data files. Any desirable security precautions may be implemented.

The computer-executable instructions may be a series or sequence of instructions for a computing device 141, 151, described in detail throughout this disclosure. The processor 103 may be configured to execute the computer-executable instructions that may be used to monitor an executable software application. Such computer-executable instructions may be located (e.g., physically or logically) in modules in the memory 115. The computer network 131 may be any network that interconnects users and/or computing devices 141, 151. According to at least one aspect of the invention, the computer network 131 may provide shared access by two computing devices to at least a portion of the data in the plurality of modules. Shared access may be two or more computing devices 141, 151 that may be coupled to the computer network 131 and/or that may be able to communicate with each other and/or access, change, and add data to a data file 121.

A computer network such as the Internet 131 provides access to the date file 121 that may be shared between the computing devices 141, 151. Additionally, the computer network may be public or private and may be wired or wireless. The computing devices 141, 151 that are coupled to the computer network may be any electronic device that is capable of connecting to a computer network and transmitting data over the computer network. Further, the computing devices are capable of receiving data for entry into a data file 121 that may be associated with a country assessment.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer executable instructions, or computer-readable data structures. In this regard, other embodiments are disclosed herein as well that can be partially or wholly implemented on a computer readable medium, for example, by storing computer executable instructions or modules or by utilizing computer readable data structures.

Figure 2:
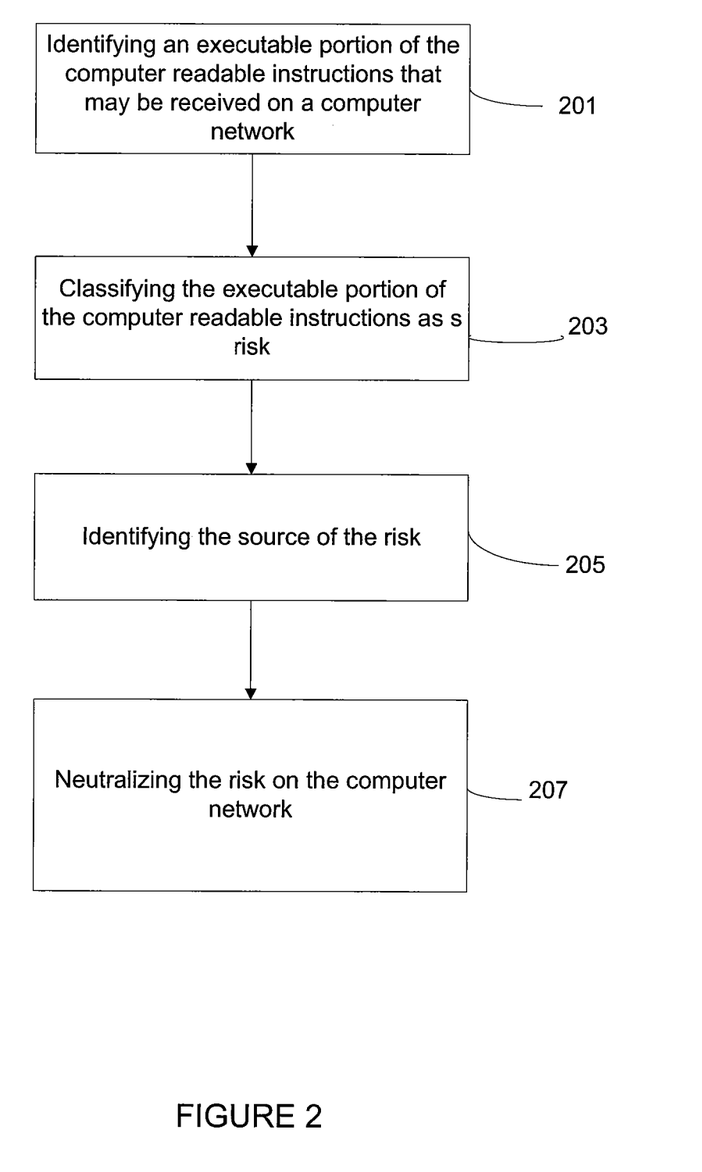
FIG. 2 is a flowchart illustrating a method of monitoring a computer executable file, in accordance with an aspect of the invention.

In reference to FIG. 2, a method of monitoring computer readable instructions is illustrated. The method may include identifying an executable portion of the computer readable instructions that may be received on a computer network, the executable portion of the computer readable instruction having a source, at step 201. The executable portion of the computer readable instructions may be classified as a risk, at step 203, and, the risk may have a source that may be identified, at step 205. As described above, the risk may be neutralized on the computer network, as illustrated in step 207.

Step 201 illustrates an executable portion of the computer readable instructions received on a computer network, such as a central system or server, as described above. The executable portion of the computer readable instructions may include receiving a download, an update, or any other transfer of electronic data between two computing systems. Moreover, downloading may include receiving data from another computing network or other computer storage media. Uploading may include sending data to another computing network or other computer storage media. The data that is received may also be saved to a memory on the computer network.

Step 203 illustrates that the executable portion of the computer readable instructions may be classified as a risk. The risk may be identified by comparing the computer readable instructions with one or more known risks. The known risks may be a computer readable instructions or computer executable download. The computer readable instructions may also contain characteristics that are similar to a known risk and may be identified as suspicious or a risk as well. The computer readable instructions may also contain characteristics that are not ordinary instructions (e.g., monitoring and documenting a user's keystrokes). The computer readable instructions that contain unusual instructions may be identified as being suspicious or risky and may be identified for further analysis and/or may be prevented from being downloaded onto the computer network.

The risk may be identified by a severity level such as low, moderate, high, or urgent. The risk may also be identified by the type of risk such as malware or specific computer virus, worm, keylogger, and/or Trojan. The risk may include information about whether the executable portion of the computer readable instructions may be include a "phone home" type of malware structure where the internal information on the computer network may be at risk of exposure to a remote unauthorized user.

The risk may be compiled in a risk history data file. The risk history data file may store information related to a risk or group of risks. The risk history data file may also compile information about characteristics of known risks such as the type of risk, the date and time at which the risk was identified, the action required to neutralize the risk, the source of the risk, any known related risks, and the like.

In step 205, the source of the risk may be identified. In some examples, the source may be an Internet Protocol (IP) address or a group of IP addresses that are located on another computer network. The source may also be identified as a website or group of websites responsible for phishing, unauthorized activity, and other risky activity. The source may be identified as a botnet that produces and sends malware for damaging computer networks and/or computing devices.

The method of monitoring computer readable instructions may also include generating a report that includes information about at least one risk. The report may include additional information, such as the name of the malware, the version of the malware, information about the malware's signature, the date on which the malware was detected, the type of solution that was used to neutralize the malware, and the like. The report may be generated and used to help create a malware signature dictionary. The malware signature dictionary includes information about the signatures of a plurality of malware and may be utilized in detecting malware or suspicious characteristics of computer readable instructions.

The report may be stored in a data file and may be stored on the computer network. The report may be updated with additional information on a periodic basis, e.g., such as one time every week, or as needed, e.g., each time a new malware signature is identified. For example, the report may be updated if a risk is identified that is classified as an urgent risk having a high priority and high likelihood of causing damage.

In step 207, the risk may be neutralized. The risk may be blocked from accessing the computer network and or may be disabled from executing its instructions. The risk may also be deleted, repaired, and/or quarantined. The risk may also undergo a cleaning process through which the executable portion of the computer readable instructions no longer contains a risky executable portion.

The risk may be neutralized by anti-virus software and may occur on either the computer network that receives the risk, e.g., malware, and/or another computer network. The risk may be neutralized by identifying, disabling, and blocking or eliminating malware. The anti-virus software may examine or scan a file to compare the signatures on the executable portions of the computer readable instructions with signatures that are known to be malware. The anti-virus software may also identify suspicious characteristics that are similar to known malware and may identify and label those executable files containing the suspicious software.

Some examples of malware may be capable of morphing the signature that is associated with the malware. In these cases, the anti-virus software may also identify the morphing as suspicious behavior and may label the malware for further analysis and possible quarantine or deletion.

Neutralizing the risk may occur when the risk is identified. For example, the risk may be neutralized immediately after it is identified as a risk. The risk may also be neutralized at any time after the risk is identified as a risk or suspicious executable instructions.

Figure 3:
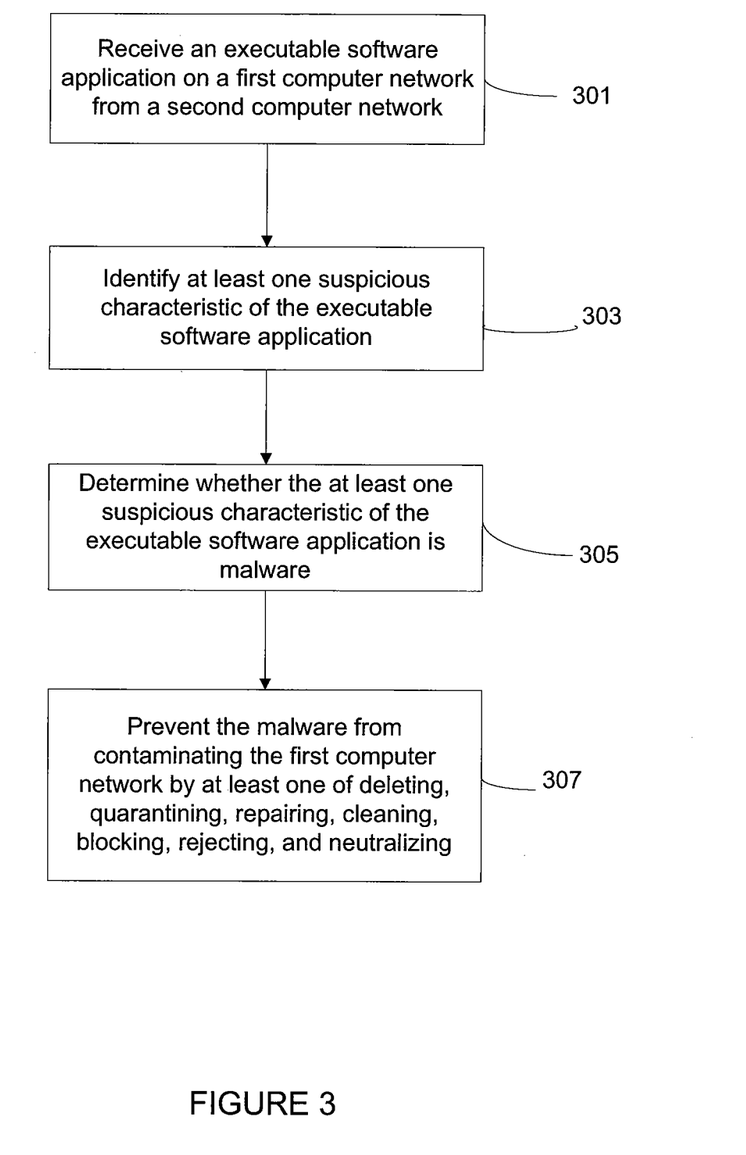
FIG. 3 illustrates a plurality of options for monitoring downloadable executable software applications, according to an aspect of the invention.

The method of monitoring computer executable instructions illustrated in FIGS. 2 and 3 that attempt to access a computer network and/or computing devices coupled to a computer network may include a database or other central data file that stores information related to the known risks, possible risks, or any other information that may assist in identifying that computer executable instructions may be capable of or configured to damage or otherwise harm a computing device or the computer network. The database or data file may be updated when a new risk is identified. The database or data file may include information relating to risks that are identified on any computer network. The database or data file may also include information about suspicious behavior and unknown or unrecognized computer executable instructions.

The database or data file may be dynamically updated to identify the most recent collection of known or possible risks to a computer network or computing devices. The update may occur in the form of a report and may include information relating to the analysis performed by one or more methods or systems that identify risky or possibly risky computer executable instructions. The report may be created and sent to update the database or data file at any time and may do so immediately or quickly after identifying a risk or a possible risk. The report may identify a risk that is identified on a first computer network and may send the report to a central system to be stored in the database or data file. The information in the central system may be stored on the computer network or may be stored on a central server to which multiple clients may be coupled. A database or data file that may be stored on the central server may be accessible by many computer networks and computing devices and may or may not be exclusive to the first computer network.

In reference to FIG. 3, a method of monitoring executable software applications is illustrated. In step 301, an executable software application is identified that is located or attempting to gain access to a first computer network. The executable software application may be sent from or attempting to gain access to the first computer network from a location on a second computer network. The executable software application may be attempting to gain access to the first computer network from any remote location that is not on the first computer network or from a computing device, such as any computing storage media, that may be configured to access the first computer network.

In step 303, at least one suspicious characteristic that is associated with the executable software application may be identified. The suspicious characteristic may contain known malware or may exhibit characteristics that are similar to known malware. The suspicious behavior may also include characteristics that are unusual for executable downloads such as generating multiple copies of a portion of the computer readable instructions and sending the copies to several computing devices or nodes on the computer network without user intervention (e.g., infecting the computer network with a worm).

The suspicious characteristic of the executable software application may be determined to be malware, as illustrated in step 305, and as described above in detail. The malware may be prevented from contaminating the first computer network by at least one of deleting, quarantining, repairing, cleaning, blocking, rejecting, or otherwise neutralizing the executable portion of the computer readable instructions.

Figure 4:
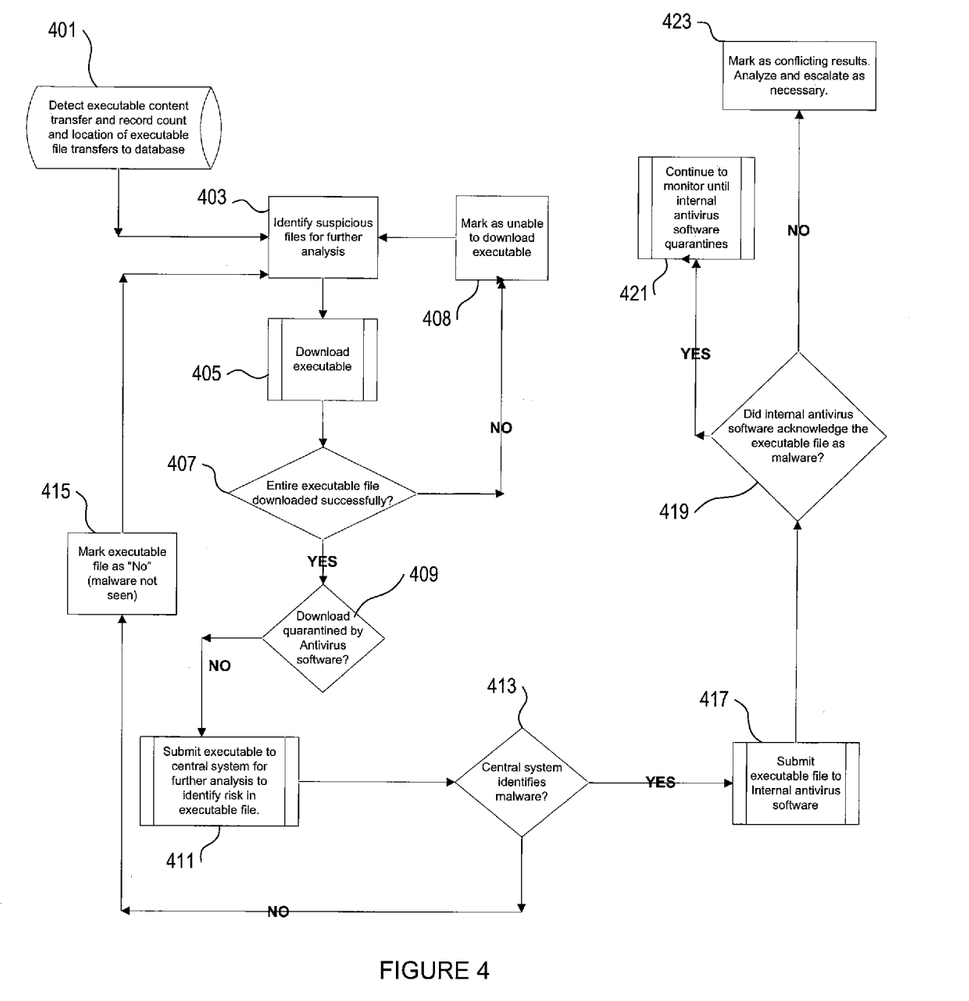
FIG. 4 illustrates process for monitoring an executable download, according to an aspect of the invention.

In reference to FIG. 4, a method of monitoring an executable software application is illustrated. The method may include detecting executable content transfer and record count and location of executable file transfers to a data file such as a database that may be stored on a central system or server, as in step 401. One or more suspicious files may be identified for further analysis, as in step 403. The suspicious files may be identified because they contain suspicious characteristics such executable instructions that monitor and document a user's keystrokes, executable instructions that attempt to write instructions to another executable program, or the like. The user may be alerted of the suspicious behavior or the monitoring system may automatically or manually identify the file for cleaning, deletion, or the like.

The identified executable file may be downloaded, as in step 405. The monitoring of executable software may then confirm that the entire executable file has been successfully downloaded to the monitoring or tracking system for analysis, as in step 407. Internal antivirus software may quarantine the executable instructions at step 409. The internal antivirus software may be stored on the computer network and/or computing devices coupled to the computer network. The internal antivirus software may be configured to protect the computer network and/or individual or groups of computing devices that may be coupled to one another or may be coupled to the computer network.

The internal antivirus software may quarantine the suspicious file at step 409. The quarantine may include requiring that the suspicious file is analyzed in greater detail before permitting the suspicious file to access the computer network. The quarantine may also include deleting, cleaning, blocking, filtering, or rejecting the executable file.

The executable file may not be capable of being downloaded to be analyzed and/or stored on the computer network, as in step 408. In this case, the file may be submitted for further analysis or may be deleted or restricted from accessing the computer network or a computing device on the computer network.

In step 411, the executable file may be submitted to a central system for further risk analysis. The central system may be any centralized system that performs an analysis on the executable file to determine whether the executable file contains a risk. The central system may include analysis by one or more antivirus software programs that each provide a result indicating whether a risk, possible risk, or suspicious behavior or characteristic is identified or the executable file does not appear to contain a risk. The central system may generate a report that indicates the analysis results of each of a plurality of antivirus software and may provide that report to the data file, the computer network, or any other location. The central system may also include the analysis results in a data file that monitors the identity of risks, possible risks, and/or suspicious behavior and may update the data file to analyze a subsequent executable file by verifying that the subsequent executable file does not contain the newly identified risk.

The central system may identify the executable file as being malware, as in step 413, by identifying a risk, possible risk, or suspicious behavior that may be associated with the executable file. If the central system does not identify malware in the executable file, then the executable file may be marked as not containing malware and may be marked as having been analyzed by the central system, as in step 415. Such an executable file may be permitted to access the computer network or a computing device that is coupled to the computer network or may be analyzed further.

If the central system determines that the executable file contains malware, then the executable file may be submitted to further analysis by antivirus software that may be contained on the computer network and/or a computing device, as in step 417. Once submitted, this internal antivirus software may further analyze the executable file or may mark the executable file for deletion, cleaning, or the like. The internal antivirus software may contain an internal data file that is stored on the computer network that includes known risks, possible risks, and/or suspicious characteristics. The internal antivirus software may compare the results that are generated from the central system regarding the risk level of the executable with the risk information that is contained in the data file on the computer network. The internal antivirus software may continuously update the data file on the computer network to assist in the initial identification of a risk when a risk is received on the computer network or by a computing device that may be coupled to the computer network.

For example, the internal antivirus software may be stored on the computer network and/or one or more computing devices that may be coupled to the computer network and may be configured to monitor the executable files that may attempt to access the computer network or the computing device. The internal antivirus software may include a data file that compiles a dynamic or continuously updated record of information that relates to a risk, possible risk, or suspicious behavior that may be identified by the central system and/or the internal antivirus software. The executable files may be confirmed to contain a risk, possible risk, and/or suspicious behavior or characteristics by both the internal antivirus software and the central system. If an executable file is identified as a risk, possible risk, or has suspicious behavior by the central system, it further may then be confirmed that the internal antivirus software also acknowledges the risk, possible risk, or suspicious behavior as such, as in step 419 (e.g., both the internal antivirus software and the central system identify a risk, possible risk, and/or suspicious behavior or characteristics).

The internal antivirus software and the central system may identify different risks, possible risks, and/or suspicious behavior in an executable file. The internal antivirus software and/or the central system may identify the conflict and may document it for further analysis. The conflict may be resolved by rejecting, filtering, blocking, deleting, cleaning, or otherwise neutralizing the risk to the computer network and/or computing devices. In this case, the executable file may be marked for continuous monitoring until it has been quarantined or neutralized.

The internal antivirus software may have performed an analysis of the executable file and may have reached the same conclusion as the central system regarding the presence of a risk, possible risk, or suspicious behavior in an executable file. If the internal antivirus software and the central system both determine that the executable file contains a risk, possible risk, of suspicious behavior, then the executable file may be marked for continuous monitoring until the executable file has been quarantined (e.g., cleaned, deleted, rejected, and the like), as illustrated in step 421. If the central system and the internal antivirus software reach differing conclusions regarding whether an executable file contains a risk, possible risk, or suspicious behavior, then the executable file may be marked as having conflicting results, may be quarantined for further analysis, may be rejected, cleaned, deleted, or may be monitored for further information, as illustrated in step 423. When conflicting results are identified, the executable file may be assigned a status level, such as low, medium, or high importance or immediate threat. The level of importance may be escalated as the threat is not resolved or quarantined, as described above.

In reference to FIG. 5, a report 501 may be generated that compiles the results of scanning an executable file on a central system, as described above. The results may include analysis from a plurality of anti-virus software 503 that are compiled by a central system and that determine whether the executable portion of the computer readable instructions contains malware. As shown in FIG. 5, the plurality of anti-virus software 503 may be available in multiple versions and the report may indicate the version 505 of the anti-virus software 503 analyzed the executable portion of the computer readable instructions. The report 501 may also include information about the latest update 507 that was made to the anti-virus software 503. The update 507 associated with each anti-virus software 503 may indicate the date on which the latest update was included in the anti-virus software 503, e.g., the latest group of signatures of malware added to the report 501.

The report 501 may also include additional information 511 such as information about the analysis that each anti-virus software 503 such as the results of whether malware was detected or whether suspicious characteristics were identified. The report 501 may also include information about the file size of the malware or suspicious file and any other desired information.

Further, the report 501 may include identifying the source of the executable file, as described in greater detail above. The source may be an IP address or external source of computer readable media. The source may be utilized to identify subsequent executable files from the same source that may be risky, possibly risk, and/or contain suspicious behavior.

The report illustrated in FIG. 5 may be generated as a result of submitting an executable file for analysis, as described in FIG. 4. The report generated in FIG. 5 may be compared against the results obtained from the internal antivirus software and may be used to update a data file stored on the computer network, computing devices coupled to the computer network, and/or the central system that may include information relating to risks, possible risks, and suspicious behavior.

Aspects of the invention have been described in terms of illustrative embodiments thereof. Numerous other embodiments, modifications, and variations are within the scope and spirit of the appended claims. For example, the steps illustrated in the figures may be performed in other than the recited order, and that one or more steps illustrated may be optional in accordance with aspects of the disclosure. Of course, the methods and systems of the above-referenced embodiments may also include other additional elements, steps, computer-executable instructions, or computer-readable data structures. In this regard, other embodiments are disclosed herein that can be partially or wholly implemented on a computer-readable medium, for example, by storing computer-executable instructions or modules, or by utilizing computer-readable data structures.

We claim:

1. A method of monitoring computer-readable instructions, comprising:
    identifying an executable portion of the computer-readable instructions received on a computer network from a source;
    determining, by a central system configured to perform an analysis to identify a risk, that the executable portion of the computer-readable instructions is a risk;
    responsive to determining by the central system that the executable portion of the computer-readable instructions is a risk, transmitting the executable portion to an internal antivirus software on a computing device for analysis and transmitting the results of the central system analysis to the computing device;
    analyzing, by the computing device, the executable portion by the internal antivirus software;
    comparing the transmitted results of the central system analysis with results of the internal antivirus software analysis to determine whether the central system and internal antivirus software obtained the same results, the comparing being performed by the computing device to which the executable portion was transmitted from the central system;
    responsive to determining, based on the comparison between the results of the central system analysis and the results of the internal antivirus software analysis, that the central system and internal antivirus software obtained the same results, marking the executable portion for continuous monitoring until the identified risk is neutralized;
    responsive to determining, based on the comparison between the results of the central system analysis and the results of the internal antivirus software analysis, that the central system and internal antivirus software obtained different results, flagging the results as conflicting and further analyzing the different results, including:
        identifying a level of importance of the conflicting results;
        neutralizing the risk on the computer network; and
        identifying a source of the risk; and
    generating a report that includes the risk, wherein the report includes a name of the risk, information about the risk's signature, a version of the risk, a type of solution that was used to neutralize the risk, a file size of the risk, and a latest update to anti-virus software,
    wherein the report is used to create a risk signature dictionary that includes information about signatures of a plurality of risks
    wherein the report is updated at least once a week; and
    using the report to update a data file that identifies future risks,
    wherein user identification and a password are required for access to the data file,
    wherein the data file includes characteristics of known risks, a date and time at which the risk was identified, an action required to neutralize the risk, a source of the risk, and related risks.

2. The method of claim 1, where the source is an Internet Protocol address.

3. The method of claim 1, further comprising blocking the source of the risk from accessing the computer network.

4. The method of claim 1, where the neutralizing the risk includes analyzing the executable portion of the computer-readable instructions with the anti-virus software.

5. The method of claim 1, where the risk is malware.

6. The method of claim 5, where the malware is at least one of a computer virus, a worm, a keylogger, and a Trojan.

7. The method of claim 1, where the risk is saved in a data store.

8. The method of claim 1, where the risk is identified as an urgent risk.

9. The method of claim 8, where the urgent risk causes the report to be updated.

10. The method of claim 1, where the neutralizing the risk occurs after the risk is identified.

11. A method of monitoring data files on a computer network, comprising:
    receiving an executable software application on a first computer network from a second computer network;
    identifying at least one suspicious characteristic of the executable software application;
    determining, by a central system configured to perform analysis to identify risk, whether the at least one suspicious characteristic of the executable software application is malware;
    responsive to determining by the central system that the at least one suspicious characteristic of the executable software application is malware, transmitting the executable software application to an internal antivirus software on a computing device for analysis and transmitting the results of the central system analysis to the computing device;
    analyzing, by the computing device, the executable software application by the internal antivirus software;
    comparing the transmitted results of the central system analysis with results of the internal antivirus software analysis to determine whether the central system and internal antivirus software obtained the same results, the comparing being performed by the computing device to which the executable software application was transmitted from the central system;
responsive to determining, based on the comparison between the results of the central system analysis and the results of the internal antivirus software analysis, that the central system and internal antivirus software obtained the same results, marking the executable software application for continuous monitoring until the identified malware is neutralized;
responsive to determining, based on the comparison between the results of the central system analysis and the results of the internal antivirus software analysis, that the central system and internal antivirus software obtained different results, flagging the results as conflicting and further analyzing the conflicting results, including:
  identifying a level of importance of the conflicting results; and
  preventing the malware from contaminating the first computer network by at least one of: deleting, quarantining, repairing, cleaning, blocking, rejecting, and neutralizing; and
generating a report that identifies the malware, wherein the report includes a name of the malware, information about the malware's signature, a version of the malware, a type of solution that was used to perform the preventing, a file size of the malware, and a latest update to anti-virus software,
wherein the report is used to create a malware signature dictionary that includes information about signatures of a plurality of malware
wherein the report is updated at least once a week; and
using the report to update a data file that identifies future malware,
wherein user identification and a password are required for access to the data file,
wherein the data file includes characteristics of known malware, a date and time at which the malware was identified, an action required to perform the preventing, a source of the malware, and related malware.

12. The method of claim 11, further comprising authenticating the executable software application based at least in part on analyzing the suspicious characteristic.

13. The method of claim 11, further comprising identifying a source of the malware.

14. The method of claim 13, where the malware is at least one of a computer virus, a worm, a keylogger, and a Trojan.

15. The method of claim 13, where the source is an Internet Protocol address.

16. The method of claim 11, where the determining whether the at least one suspicious characteristic of the executable software application is malware includes an analysis of the executable software application by the anti-virus software.

17. The method of claim 16, where the analysis by the anti-virus software is at least partially performed on the computer network.

18. A risk monitoring system, comprising:
  at least one computing device that contains computer readable instructions for authenticating an executable software application received on a computer network;
  a receiver for receiving data associated with the executable software application;
  a server comprising memory for storing the data in a data file; and
  a processor for executing the computer-executable instructions to perform a method, comprising:
    receiving the executable software application on a first computer network from a second computer network;
    identifying at least one suspicious characteristic of the executable software application;
    determining, by a central system configured to perform analysis to identify a risk, whether the at least one suspicious characteristic of the executable software application is malware;
    responsive to determining by the central system that the at least one suspicious characteristic of the executable software application is malware, transmitting the executable software application to an internal antivirus software on a computing device for analysis and transmitting the results of the central system analysis to the computing device;
    analyzing, by the computing device, the executable software application by the internal antivirus software;
    comparing the transmitted results of the central system analysis with results of the internal antivirus software analysis to determine whether the central system and internal antivirus software obtained the same results, the comparing being performed by the computing device to which the executable portion was transmitted from the central system;
    responsive to determining, based on the comparison between the results of the central system analysis and the results of the internal antivirus software analysis, that the central system and internal antivirus software obtained the same results, marking the executable software application for continuous monitoring until the identified malware is neutralized;
    responsive to determining, based on the comparison between the results of the central system analysis and the results of the internal antivirus software analysis, that the central system and internal antivirus software obtained different results, flagging the results as conflicting and further analyzing the different results, including:
      identifying a level of importance of the conflicting results; and
      preventing the malware from contaminating the first computer network by at least one of: filtering, blocking, rejecting, and neutralizing; and
    generating a report that identifies the malware, wherein the report includes a name of the malware, information about the malware's signature, a version of the malware, a type of solution that was used to perform the preventing, a file size of the malware, and a latest update to anti-virus software,
    wherein the report is used to create a malware signature dictionary that includes information about signatures of a plurality of malware
    wherein the report is updated at least once a week; and
    using the report to update the data file that identifies future malware,
    wherein user identification and a password are required for access to the data file,
    wherein the data file includes characteristics of known malware, a date and time at which the malware was identified, an action required to perform the preventing, a source of the malware, and related malware.

19. A method comprising:
identifying an executable portion of the computer-readable instructions received on a computer network from an Internet Protocol address, wherein the identifying occurs by comparing the executable portion of the computer-readable instructions with known computer viruses,
wherein the executable portion of the computer-readable instructions includes a phone home type of computer virus structure where internal information on the computer network is at risk of exposure to a remote unauthorized user;
using a centralized server, analyzing the executable portion and classifying the executable portion of the computer-readable instructions as a computer virus;
transmitting from the centralized server, the executable portion and the results of the analysis to a computing device including internal antivirus software;
wherein the computer virus is given a severity level,
wherein the classifying occurs when at least one suspicious characteristic is associated with the executable portion of the computer-readable instructions,
wherein the at least one suspicious characteristic includes generating multiple copies of a portion of the executable portion of the computer-readable instructions, sending the copies to several computing devices on the computer network without user intervention, monitoring a user's keystrokes, attempting to write instructions to another executable program, and a morphing of a signature of the computer virus;
tagging, by the computing device, the executable portion of the computer-readable instructions for further analysis by an internal antivirus software;
analyzing the tagged executable portion of the computer-readable instructions with the internal antivirus software stored in memory local to a system, wherein the anti-virus software examines the computer virus by comparing the signature of the computer virus with signatures of known computer viruses;
comparing the transmitted results of the centralized server analysis with results of the internal antivirus software analysis to determine whether the centralized server and internal antivirus software obtained the same results, the comparing being performed by the computing device to which the executable portion was transmitted from the central system;
responsive to determining, based on the comparison between the results of the central system analysis and the results of the internal antivirus software analysis, that the centralized server and the internal antivirus software obtained the same results, marking the executable portion for continuous monitoring until the identified computer virus is neutralized;
responsive to determining, based on the comparison between the results of the central system analysis and the results of the internal antivirus software analysis, that the centralized server and the internal antivirus software obtained different results, flagging the results as conflicting and further analyzing the different results, including:
identifying a level of importance of the conflicting results;
identifying a source of the computer virus;
blocking the source of the computer virus from accessing the computer network; and
neutralizing the computer virus on the computer network,
wherein the neutralizing the computer virus includes analyzing the executable portion of the computer-readable instructions with the anti-virus software, and further includes deleting the computer virus,
generating a report that identifies the computer virus, wherein the report includes a name of the computer virus, information about the computer virus's signature, a version of the computer virus, a type of solution that was used to neutralize the computer virus, a file size of the computer virus, and a latest update to the anti-virus software,
wherein the report is used to create a computer virus signature dictionary that includes information about signatures of a plurality of computer viruses
wherein the report is updated at least once a week; and
using the report to update a data file that identifies a future computer virus,
wherein user identification and a password are required for access to the data file,
wherein the data file includes characteristics of known computer viruses, a date and time at which the computer virus was identified, an action required to neutralize the computer virus, a source of the computer virus, and related computer viruses.

* * * * *